United States Patent
Cros et al.

(10) Patent No.: US 7,617,072 B2
(45) Date of Patent: Nov. 10, 2009

(54) DEVICE FOR CREATING A FULL THREE-DIMENSIONAL REPRESENTATION OF A LIMB OF A PATIENT FROM A REDUCED NUMBER OF MEASUREMENTS TAKEN FROM SAID LIMB

(75) Inventors: Francois Cros, Ivry sur Seine (FR); Jose-Maria Fullana, Paris (FR)

(73) Assignee: Laboratoires Innothera, Arueil (FR)

( * ) Notice: Subject to any disclaimer, the term of this patent is extended or adjusted under 35 U.S.C. 154(b) by 0 days.

(21) Appl. No.: 11/661,988

(22) PCT Filed: Sep. 5, 2005

(86) PCT No.: PCT/FR2005/002200

§ 371 (c)(1),
(2), (4) Date: Jun. 9, 2008

(87) PCT Pub. No.: WO2006/027490

PCT Pub. Date: Mar. 16, 2006

(65) Prior Publication Data

US 2008/0270069 A1    Oct. 30, 2008

(30) Foreign Application Priority Data

Sep. 6, 2004 (FR) .................................. 04 09384

(51) Int. Cl.
*G01B 21/02* (2006.01)
*G01B 21/04* (2006.01)
*G06F 19/00* (2006.01)

(52) U.S. Cl. ..................................................... 702/166

(58) Field of Classification Search ................. 702/166, 702/150–155, 158; 703/6, 7, 11
See application file for complete search history.

(56) References Cited

U.S. PATENT DOCUMENTS 5,590,268 A * 12/1996 Doi et al. ..................... 715/848

(Continued)

FOREIGN PATENT DOCUMENTS

WO    WO 03/017206 A1    2/2003
WO    WO 2004/095342    * 11/2004

OTHER PUBLICATIONS

Geisen, R. Glen et al., "Automatic Detection, Identification, and Registration of Anatomical Landmarks from 3-D Laser Digitizer Body Segment Scans," Proceedings of 17th International Conference of the Engineering in Medicine and Biology Society Sep. 20-23, 1995, vol. 1.

*Primary Examiner*—Michael P. Nghiem
*Assistant Examiner*—Cindy H Khuu
(74) *Attorney, Agent, or Firm*—Jacobson Holman PLLC

(57) ABSTRACT

The device comprises means for taking a height measurement (H) and a plurality of circumference measurements (b, c, g) on the limb of the patient at different predetermined z-positions (zb, zc, zg). A first data file includes the coordinates ($X_0$, $Y_0$, $Z_0$) of a first mesh of points (24) representative of the morphological characteristics of a reference limb, these points being distributed over the surface of the reference limb along a succession of outlines (26) defined at different successive Z-positions. Morphology generator means recalculate the coordinates of the first mesh of points as a function of the height measurement (H) and of the circumference measurements (b, c, g) in such a manner as to produce a second data file comprising the coordinates (x, y, z) of a second mesh of points (52) representative of morphological characteristics of the patient's limb.

9 Claims, 3 Drawing Sheets

U.S. PATENT DOCUMENTS

| | | | |
|---|---|---|---|
| 5,871,018 A * | 2/1999 | Delp et al. | 128/898 |
| 6,968,075 B1 * | 11/2005 | Chang | 382/111 |
| 2004/0068337 A1 * | 4/2004 | Watson et al. | 700/98 |
| 2005/0256689 A1 * | 11/2005 | Schulz | 703/11 |
| 2006/0235656 A1 * | 10/2006 | Mochimaru et al. | 703/1 |
| 2007/0055537 A1 * | 3/2007 | Bassez et al. | 705/2 |
| 2007/0135737 A1 * | 6/2007 | Vastano | 600/587 |
| 2008/0221425 A1 * | 9/2008 | Olson et al. | 600/407 |

* cited by examiner

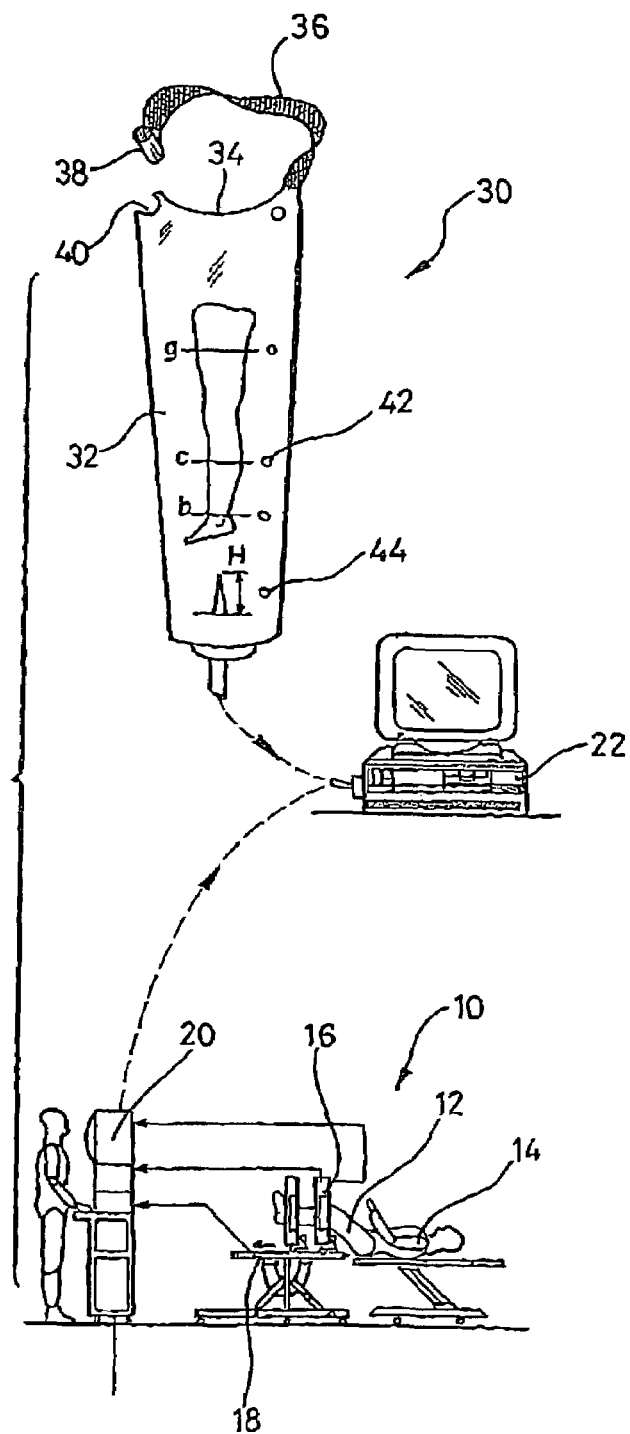
FIG_1
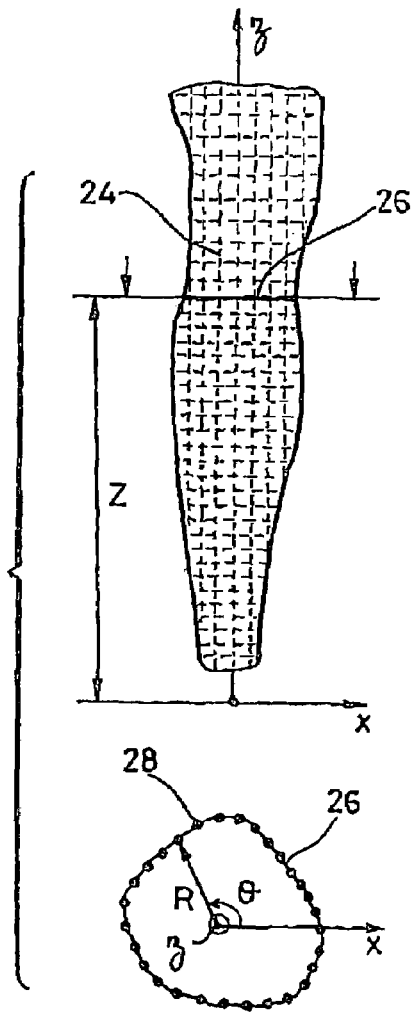
FIG_2

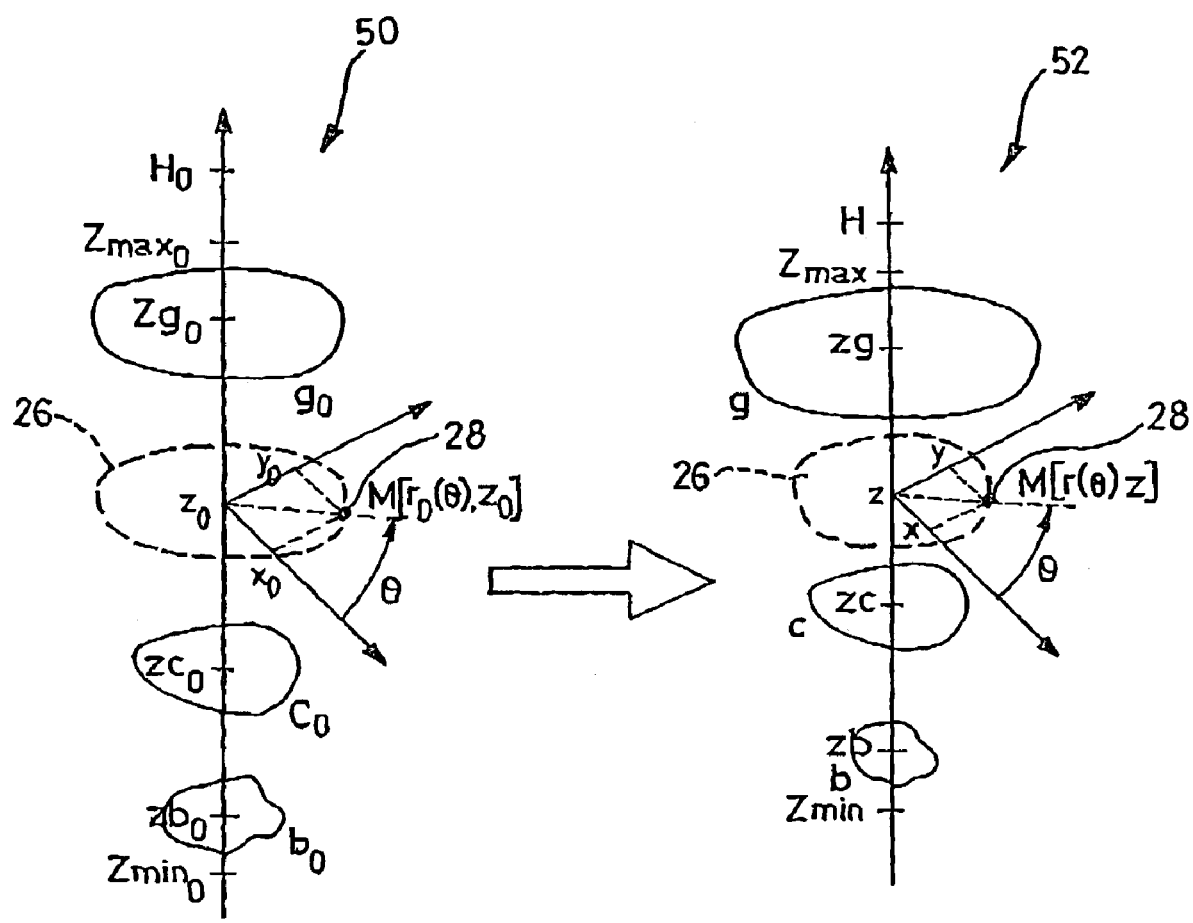
FIG_3

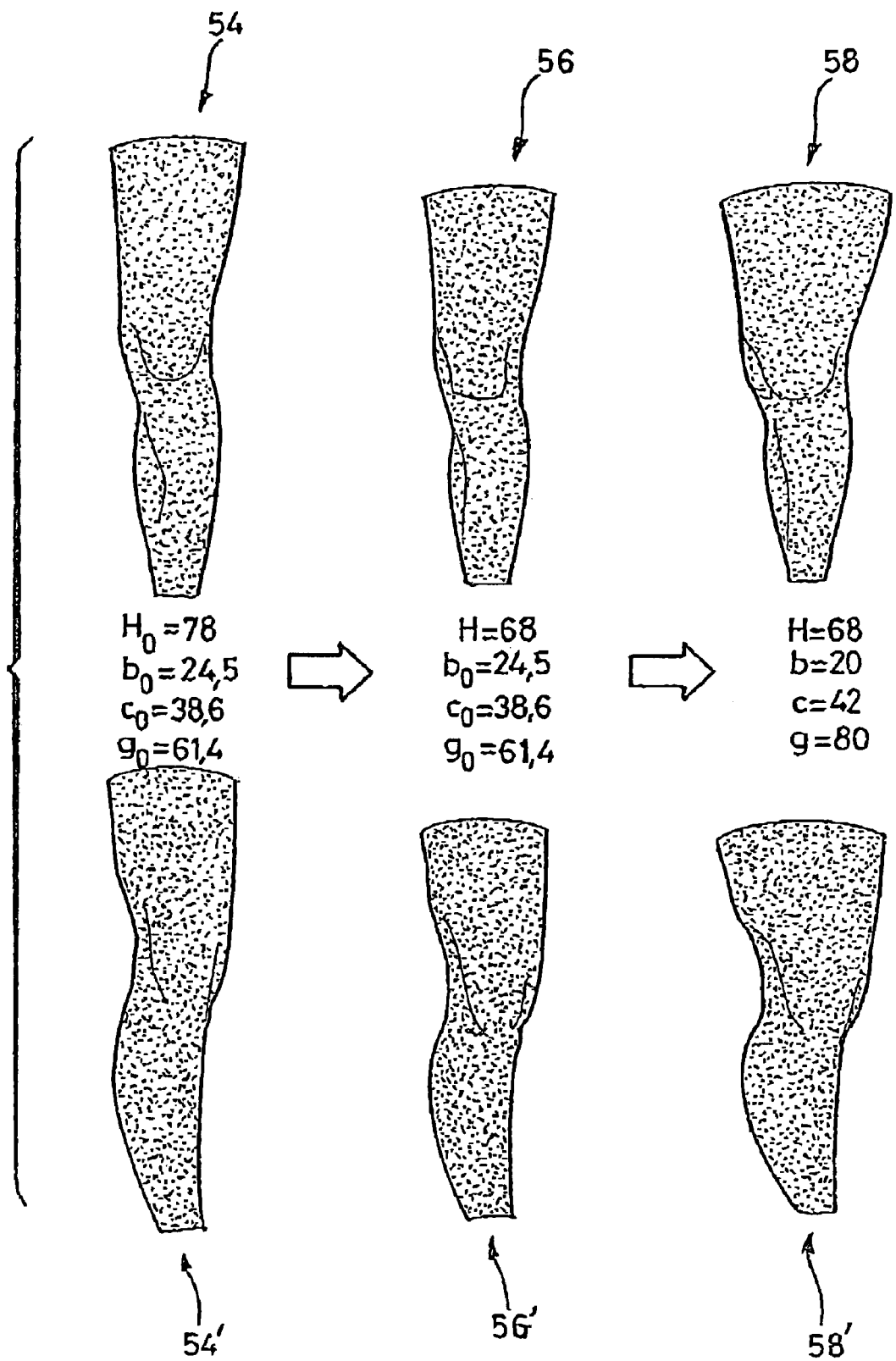

DEVICE FOR CREATING A FULL THREE-DIMENSIONAL REPRESENTATION OF A LIMB OF A PATIENT FROM A REDUCED NUMBER OF MEASUREMENTS TAKEN FROM SAID LIMB

This is a 371 of PCT/FR2005/002200 filed 5 Sep. 2005.

FIELD OF THE INVENTION

Background of the Invention

The invention relates to taking morphological data from a patient's limb.

More precisely, the invention relates to a device for establishing a complete three-dimensional representation of a patient's limb from a small number of measurements taken thereon.

The invention is applicable in particularly advantageous manner to selecting compression ortheses, i.e. ortheses such as elastic stockings, socks, tights, etc. for exerting compression on a segment of a limb under the effect of return forces generated by elastic fibers, thus producing positive compression on the limb. The usual indication for ortheses of this type is venous insufficiency in the lower limbs.

One of the difficulties for the practitioner (generally an orthopedist or a pharmacist), particularly in association with ortheses of the most compressive classes, lies in selecting a size and an orthesis class that are best adapted to the pathology of the patient, i.e. that will produce compression over the entire extent of the limb that is neither too weak nor too strong.

Other than making stockings to measure, the practitioner must select a particular size from pre-existing dimensional ranges, in which the pressures applied by the various articles in said ranges are established on the basis of a template of standardized shape and dimensions ("Hohenstein model").

In practice, an orthesis size is obtained by measuring the patient's leg at various heights, e.g. two perimeter measurements, one at the ankle and one at the calf or at the thigh, and measuring the ground to knee height or the inside leg height. On the basis of these measurements, the orthopedist or pharmacist determines the size that is assumed to be the most appropriate for the patient by using a table or a scale.

Proceeding in that way does not give the practitioner a clear idea of the pressure profile that will actually be applied to the leg. Unfortunately, prescribing an inappropriate orthesis can give rise locally to certain zones in which compression is excessive, or conversely not sufficient.

Tools do indeed exist that make it possible, starting from a complete three-dimensional representation of a limb in the form of a mesh of points, to simulate compressive pressure values that are likely to be exerted by a given orthesis, given knowledge of the dimensional and rheological characteristics of the orthesis. By way of example, one such tool is described in FR-A-2 852 421 (Laboratoire Innothéra) published on Sep. 17, 2004 for a "Device for providing assistance in selecting a compressive orthesis, and for adapting it to the morphology of a limb" which describes means implemented by software that enable a practitioner to evaluate the suitability of such or such a size of orthesis for the leg morphology of a given patient, so as to be able to make a selection with knowledge of the facts, thereby making it possible to obtain an optimum therapeutic effect for the patient.

Nevertheless, that tool requires a complete data file to be available that is representative of the morphological characteristics of the limb of the patient in question, all that is in the form of a mesh of several hundred points distributed over the surface of the limb. Obtaining such a file involves mapping the limb very precisely, e.g. by means of a laser plethysmograph installation of the kind described in FR-A-2 774 276 and FR-A-2 804 595 (Innothéra Topic International). Nevertheless, that is a laboratory instrument that is unsuitable for implementing in the office of a pharmacist or of an orthopedist. Various devices have indeed been proposed that are simpler for establishing a complete map of a limb, however their unit cost and the strict conditions required for operating them have not enabled them to enter into widespread use with practitioners who might potentially use them.

SUMMARY OF THE INVENTION

One of the objects of the invention is to provide a device making it possible from a small number of measurements taken on the limb (e.g. a height measurement and three circumference measurements) to establish a three-dimensional representation of the patient's limb in the form of a complete mesh of points, which representation can be subjected to all desirable computer processing for the purposes of display, compression simulation, and providing assistance in selecting a suitable size and type of orthesis—these other functions being easy to implement using appropriate software loaded onto the practitioner's microcomputer.

Another object of the invention is to establish, from the above device and statistical summaries, a library of morphotypes, i.e. representative limb models. This library of morphotypes can make it possible, for example when carrying out clinical studies of a population of patients, to see whether the present range of different sizes for a product is well adapted to the majority of the population or whether, on the contrary, a different range of sizes would be more appropriate for covering the needs of a larger number of patients.

In order to achieve the above objects, the invention proposes a device comprising means that are themselves known for taking measurements on a patient's limb comprising a height measurement and a plurality of circumference measurements taken at different predetermined measurement z-positions.

In a manner characteristic of the invention, there are provided means for storing a first data file containing the coordinates of a first mesh of points representative of the morphological characteristics of a reference limb, these points being distributed in three-dimensional space over the surface of the reference limb along a succession of outlines defined at different successive positions along the limb. There are also provided morphology generator means suitable for recalculating the coordinates of the first mesh of points as a function of said height measurement and of said circumference measurements so as to produce and store a second data file comprising the coordinates of a second mesh of points representative of morphological characteristics of the patient's limb.

The coordinates of the points include a z-position coordinate, and the first data file includes a reference height, and the morphology generator means are advantageously means suitable for recalculating the z-position coordinate of each point of the mesh, by applying to said z-position coordinate a transformation function based both on said reference height and on said measured height, in particular a proportional redistribution function based on the ratio between the measured height and the reference height.

The coordinates of the points also include Cartesian or polar coordinates defining the position of the point on an outline situated at a given z-position, and the morphology generator means are advantageously means suitable for recalculating the position coordinates of each point of the mesh by applying a transformation function to said position coordinates, which function is based on said circumference measurements.

Under such circumstances, it is possible in particular to recalculate the position coordinates of each point of the mesh situated at a z-position equal to said predetermined measurement z-positions, by applying to said position coordinates a transformation function based on the local deformation of the outline measured at said z-position relative to the outline of the reference limb at the same z-position, said local deformation being determined in particular on the basis of the difference between the circumference measured at said z-position and the value of the circumference of the outline of the reference limb at said z-position.

For the points of the mesh that are situated at a z-position intermediate between said predetermined measurement z-positions, their position coordinates can be recalculated by interpolation between the position coordinates recalculated for each point of the mesh situated at said predetermined measurement z-positions, e.g. by linear interpolation or by polynomial interpolation of order 2.

BRIEF DESCRIPTION OF THE DRAWINGS

There follows a description of an embodiment of the device of the invention given with reference to the accompanying drawings in which the same numerical references designate elements that are identical or functionally similar from one figure to another.

FIG. 1 is a diagrammatic view showing the various means that contribute to implementing the invention.

FIG. 2 shows how the leg of a patient is modeled.

FIG. 3 shows the transformation of data concerning a reference limb to the limb of the patient.

FIG. 4 is a concrete example showing the effect of successive transformations serving to go from a reference limb to the limb of the patient, the limb being seen from in front in the top half of the figure and in three-quarters rear view in the bottom half of the same figure.

DESCRIPTION OF THE PREFERRED EMBODIMENTS

FIG. 1 is a general view of the various means enabling the present invention to be implemented.

The first step is to set up a data file forming a complete three-dimensional representation of a reference limb.

This representation, which is set up once and for all, can be obtained in a laboratory on a standard subject, or else using a reference leg model, for example a "Hohenstein leg".

For this purpose, it is possible to use an installation 10 of the kind disclosed in above-mentioned FR-A-2 774 276 and FR-A-2 804 595, which describe a laser plethysmograph suitable for establishing a very accurate map of a limb 12 of a subject 14 along successive sections of the limb. The plethysmograph 10 has a ring of sensors 16 for analyzing the shape of a section of the leg placed in the central space of the ring by triangulation. The ring can be moved in translation along a linear axis 18 over the entire length of the limb 12 in successive steps in order to repeat the taking of measurements at different sections. The measurement signals, and the positions of the circular axis and of the linear axis are transmitted to a device 20, enabling a three-dimensional representation of the leg to be reconstituted from said information in the form of a data file representative of the morphology of a reference limb, which file can subsequently be loaded into a microcomputer 22 of a prescribing orthopedist or pharmacist.

This three-dimensional representation is shown in FIG. 2. It is in the form of a data file corresponding to a mesh 24 of points defined for a series of sections 26 situated at successive Z positions. By way of example, this data corresponds to the positions of points 28 defined by their Z position and by Cartesian coordinates (x,y) or polar coordinates (r,θ) relative to an Ox, Oz frame of reference. The origin of the frame of reference in the Z direction corresponds to Z=0 on the ground, so as to have an absolute vertical frame of reference.

Once the data file corresponding to the reference limb has been made up in this way, and loaded into the prescribing practitioner's microcomputer, then the practitioner can take measurements on the limbs of the various patients who come for consultation.

By way of example, the taking of measurements can involve taking four measurements, namely a height measurement H and three circumferential measurements b, c, and g taken at predetermined measurement positions: at the ankle, at the calf, and at the top of the thigh, in compliance with the "Hohenstein standard" defining the topography of measuring points. Optionally it is also possible to take two additional measurements d and f at the knee and at the bottom of the thigh.

Advantageously, these measurements can be taken using a device of the kind described in WO-A-00/44282 (Innothéra Topic International) which is a device 30 comprising a unit 32 of shape designed to be easily held in one hand, having at one of its ends a concave portion 34 for application against the leg being measured. A tape 36 is mounted on an automatic winder which has locking means 38, 40 for co-operating with the tape and the concave face to form an outline of varying circumference around the limb. The perimeter measurement, as defined by the dimensions of this loop, is given by an encoder indicator in the unit 32. A pushbutton 42 serves to enter the measurement and cause it to be stored in the microcomputer 22. A pushbutton 44 is also provided corresponding to measuring the inside leg height, measured using the tape 36 or by other any means, e.g. an ultrasound telemeter system.

The various measurements are taken and entered by pressing on the pushbutton. Once this operation has been undertaken, the microcomputer 22 of the practitioner then contains firstly a complete three-dimensional representation of a reference limb, and secondly a small number of measurement values taken on the limb of a given patient, the values being four in number (H, b, c, g) in the example described.

The following steps consists in transforming the three-dimensional representation of the reference limb, as a function of the measurements taken on the patient's limb, so as to obtain a new complete three-dimensional representation that is representative of the patient's limb.

This transformation is shown in FIGS. 3 and 4 (FIG. 4 corresponding to a particular implementation).

This transformation is performed in two stages.

The first stage serves to take account of the measured height H in order to modify the mesh of points of the reference limb by redistributing the points of the mesh over that height, in proportional manner.

If the height of the reference limb is written $H_0$ and if the extreme dimensions of the mesh of point's are written $Z_{min}$ and $Z_{max}$, then the transformation is performed by an algorithm such as the following:

Calculate the projection ratio:

$dh=H/H_0$

Calculate the start and end altitudes $Z_{min}$=dh $Z_{min}$ $Z_{max}$=dh $Z_{max}$ Project the morphology:
for z=$Z_{min}$ to $Z_{max}$:
    for the x coordinate:
        search for local bounds $x_{top}$ and $x_{bottom}$ in the initial morphology interpolate x between $x_{top}$ and $x_{bottom}$
    for the y coordinate:
        search for local bounds $y_{top}$ and $y_{bottom}$ in the initial morphology interpolate y between $y_{top}$ and $y_{bottom}$ In FIG. 4, references 56 and 56' (respectively in face view and in three-quarters rear view) show the result of this first redistribution performed on the initial reference member 54, 54' as a function of the inside leg height H measured on the patient.

The second stage consists in applying the circumference measurements b, c, and g to the intermediate mesh of points resulting from the preceding transformation.

In this stage, the intermediate morphology is modified using a deformation function written f. It is derived from local deformations at the positions the measurements were taken and it is generalized to the other positions by linear interpolation or by polynomial interpolation of order 2, using an algorithm such as the following:

Calculate the local deformations:

$f(g)=(g-g_0)/g_0$ $f(c)=(c-c_0)/c_0$ $f(b)=(b-b_0)/b_0$

Calculate the deformation function;

f(z)

Calculate the final morphology:

$R(z)=[1+f(z)]r_0(z)$ $x=r(z)\cos \theta$ $y=r(z)\sin \theta$

In FIG. 4, references 58 and 58' (respectively a face view and a three-quarters rear view) show the result of this second redistribution performed on the intermediate representation 56, 56' as a function of circumference measurements b, c, and g.

This produces a complete mesh giving a realistic complete three-dimensional representation corresponding to any given patient, merely on the basis of a very small number of measurements taken on the patient. This complete three-dimensional representation can easily be displayed on the screen of the practitioner's microcomputer, used for simulating the compression pressures produced by such and such a type of stocking, thereby assisting the practitioner in selecting a type and a size of stocking, etc.

In the above description, the representation of the patient's limb is produced on the basis only of the morphology of the reference limb. Nevertheless, in order to take account of potential variability between patients, it is also possible to have a plurality of different reference limbs corresponding to typical morphologies, such as a leg that is very muscular, a thigh with little muscle, an ankle edema, etc. It suffices for the practitioner to select as the reference limb the limb having typical morphology closest to that of the patient, with the remaining operations then taking place in identical manner.

The invention claimed is:

1. A device for establishing a complete three-dimensional representation of a patient's limb from a small number of measurements taken on the limb, the device comprising:

means for taking measurements on the patient's limb, said measurements comprising a height measurement (H) and a plurality of circumference measurements (b, c, g) taken at different predetermined measurement positions (zb, zc, zg);

means for storing a first data file containing the coordinates ($x_0$, $y_0$, $z_0$) of a first mesh of points (24) representative of the morphological characteristics of a reference limb, these points (28) being distributed in three-dimensional space over the surface of the reference limb along a succession of outlines (26) defined at different successive positions (Z) along the limb; and morphology generator means suitable for recalculating the coordinates of the first mesh of points as a function of said height measurement (H) and of said circumference measurements (b, c, g) so as to produce and store a second data file comprising the coordinates (x, y, z) of a second mesh of points representative of morphological characteristics of the patient's limb.

2. The device of claim 1, in which the coordinates of the points include a z-position coordinate and the first data file comprises a reference height ($H_0$), and in which the morphology generator means are means suitable for recalculating the z-position of each point of the mesh by applying to said z-position a transformation function that is determined both by said reference height ($H_0$) and by said measured height (H).

3. The device of claim 2, in which the morphology generator means are means suitable for recalculating the z-position coordinate of each point of the mesh by applying to said z-position coordinate a proportional redistribution function based on the ratio ($H/H_0$) between the measured height and the reference height.

4. The device of claim 1, in which the coordinates of the points include Cartesian coordinates (x, y) or polar coordinates (r, $\theta$) defining the position of a point on an outline (26) situated at a given z-position, and in which the morphology generator means are means suitable for recalculating the position coordinates of each point of the mesh by applying to said position coordinates a transformation function based on said circumference measurements (b, c, g).

5. The device of claim 4, in which the morphology generator means are means suitable for recalculating the position coordinates of each point of the mesh situated at a z-position equal to said predetermined measurement positions (zb, zc, zg) by applying to said position coordinates a transformation function based on the local deformation of the outline measured at said z-position relative to the outline of the reference limb at the same z-position.

6. The device of claim 5, in which the morphology generator means are means suitable for determining said local deformation on the basis of the difference ($g-g_0$; $c-c_0$; $b-b_0$) between the circumference measurements (g; c; b) at said z-position and the value of the circumference ($g_0$; $c_0$; $b_0$) of the outline of the reference limb at said z-position.

7. The device of claim 5, in which the morphology generator means are means suitable for recalculating the position coordinates of each point of the mesh situated at a z-position intermediate between said predetermined measurement position by interpolation between the recalculated position coordinates of each point of the mesh situated at said predetermined measurement positions.

8. The device of claim 7, in which said interpolation is linear interpolation.

9. The device of claim 7, in which said interpolation is polynomial interpolation of order 2.

* * * * *